United States Patent
Godoroja

(12) 
(10) Patent No.: US 6,260,168 B1
(45) Date of Patent: Jul. 10, 2001

(54) PAGING SYSTEM HAVING OPTIONAL FORWARD ERROR CORRECTING CODE TRANSMISSION AT THE DATA LINK LAYER

(75) Inventor: Andrei Godoroja, North Vancouver (CA)

(73) Assignee: Glenayre Electronics, Inc., Charlotte, NC (US)

(*) Notice: Subject to any disclaimer, the term of this patent is extended or adjusted under 35 U.S.C. 154(b) by 0 days.

(21) Appl. No.: 09/159,523

(22) Filed: Sep. 23, 1998

(51) Int. Cl.[7] ................................... H03M 13/00
(52) U.S. Cl. ............................. 714/752; 209/230
(58) Field of Search ...................... 375/262, 265; 382/240, 232; 714/752, 792, 708; 709/230

(56) References Cited

U.S. PATENT DOCUMENTS

| | | | |
|---|---|---|---|
| 5,233,629 | * 8/1993 | Paik et al. | 375/262 |
| 5,321,275 | * 6/1994 | Paik et al. | 375/265 |
| 5,453,997 | * 9/1995 | Roney, IV | 714/774 |
| 5,577,134 | * 11/1996 | Weterink | 382/240 |
| 5,699,365 | * 12/1997 | Klayman et al. | 714/708 |
| 5,850,482 | * 12/1998 | Meany et al. | 382/232 |
| 5,862,156 | * 1/1999 | Huszar et al. | 371/43.7 |
| 5,892,464 | * 4/1999 | John et al. | 714/786 |
| 6,069,920 | * 5/2000 | Schulz et al. | 375/242 |

OTHER PUBLICATIONS

Christopoulos et al., "A Hybrid Method for Image Partitioning in Low Bit Rate Segmented Image Coding", 1977 IEEE, pp. 845–848.*

Park et al., "Efficient Hierarchical Segmentation Based on PSNR for Low Bit Rate Coding", 1966 IEEE, pp. 157–160.*

* cited by examiner

Primary Examiner—Albert Decady
Assistant Examiner—David Ton
(74) Attorney, Agent, or Firm—Christensen O'Connor Johnson Kindness PLLC

(57) ABSTRACT

A method and system for performing optional or selective forward error correction (FEC) on data within the data link layer before the data is transmitted. First, a determination is made as to what data in the data link layer requires to be FEC encoded. Next, the data link layer data determined to require FEC encoding is protected by FEC and the remaining data link layer data is not FEC protected. A data application or any network protocol layer above the data link layer determines the portions required to be FEC encoded.

8 Claims, 2 Drawing Sheets

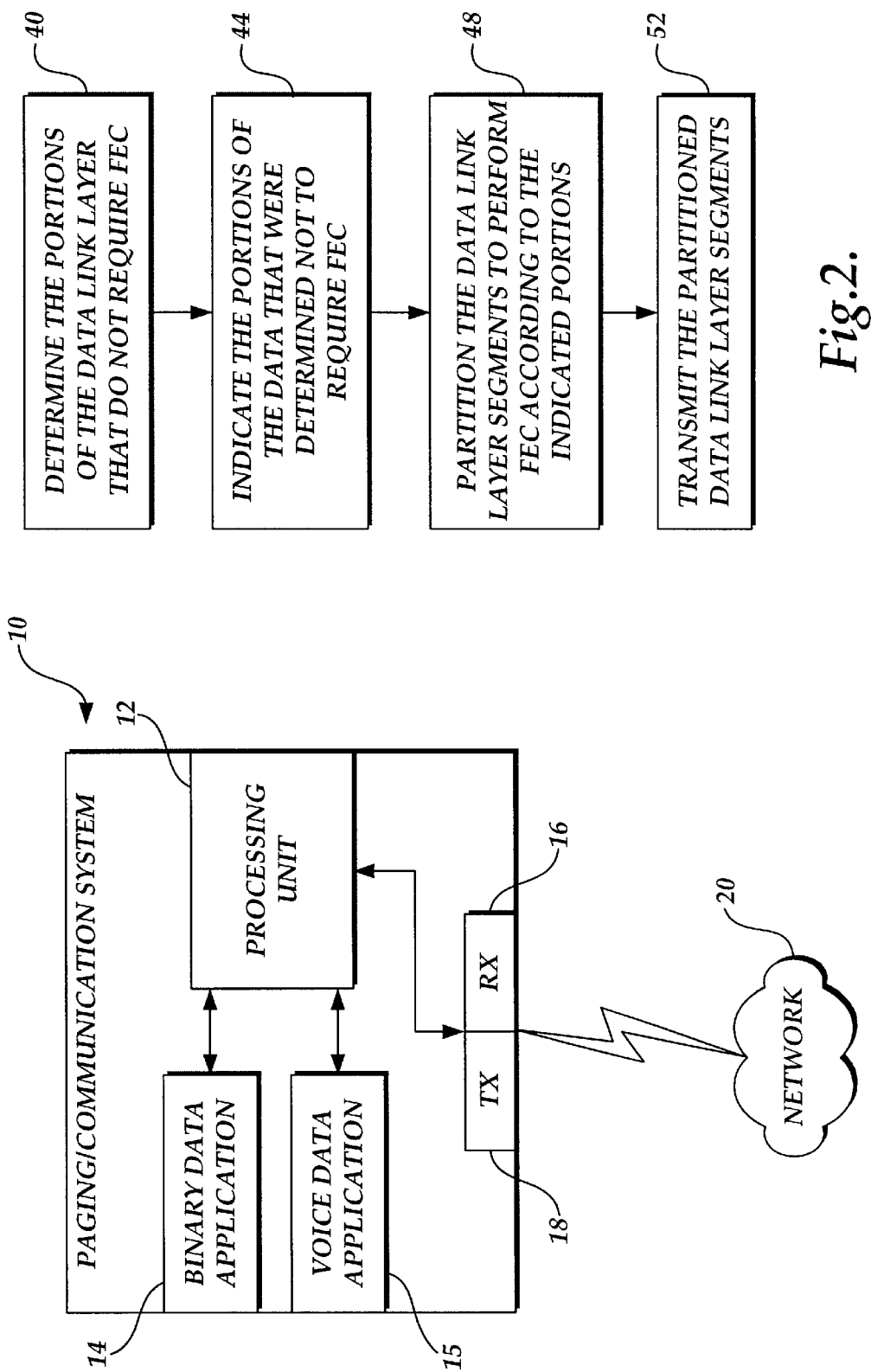

Figure 3:
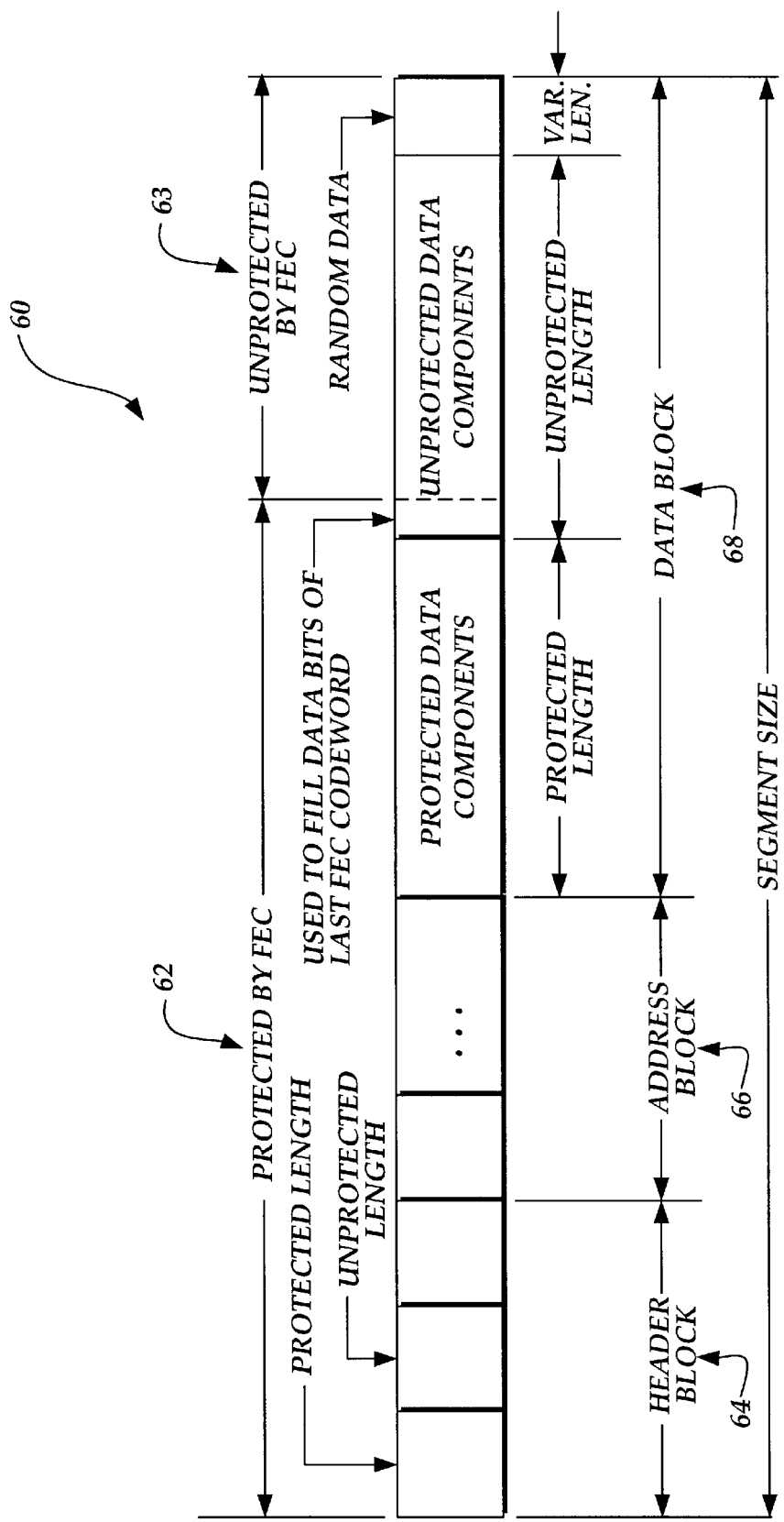

PAGING SYSTEM HAVING OPTIONAL FORWARD ERROR CORRECTING CODE TRANSMISSION AT THE DATA LINK LAYER

FIELD OF THE INVENTION

This invention relates to methods and apparatus for transmitting data and, more particularly, methods and apparatus for providing more efficient forward error correction coding of the transmitted information.

BACKGROUND OF THE INVENTION

Paging systems are now widely used to communicate information to a person carrying a mobile paging unit. Typically, the paging system includes one or more paging terminals connected together in a network. The paging terminal network may then be connected to the public switched telephone network (PSTN) or other types of networks such as the Internet so that parties may generate paging messages for transmission to the mobile paging unit. Also included in the paging system are paging transmitters that are connected to one or more paging terminals. The paging terminals formulate and format the paging messages and forward the paging messages to the paging transmitters for transmission.

The paging transmitters transmit the paging messages in accordance with predetermined paging protocols, such as POCSAG, FLEX, and ERMES. These protocols include multiple layers. For example, the second-lowest layer, the data link layer, governs direct host-to-host communication over the communications medium between the hardware at different hosts; the highest layer is used directly by user applications. Each layer builds on the layer beneath it. The advantages of different layers of protocols is that the methods of passing information from one layer to another are specified clearly as part of the set of protocols on different layers that work together (i.e., protocol suite), and changes within a protocol layer are prevented from affecting the other layers. This greatly simplifies the task of designing and maintaining communication programs. Two examples of protocol suites are the OSI protocol suite, which has seven layers and includes every layer from the network application down to the hardware, and TCP/IP, which has two layers and is the foundation of network applications on the Internet.

Somewhere between the lowest protocol layer and the application, the data must be checked to be free of errors. Depending on the protocol suite, this error detection, and sometimes error correction, can be performed at one of a number of layers. In a paging environment, it is the data link layer that is responsible for both error detection and correction using a forward error correction (FEC) technique, well-known to people skilled in the art of paging and radio data protocols. Error detection and correction are vital for alphanumeric and binary data, but some types of data, such as voice data, may be designed to allow a certain amount of errors in transmission and therefore do not require FEC. Not only does FEC require significant processing, but FEC adds a data overhead of an additional 50% or more. Thus, FEC becomes a redundant procedure which results in a large required bandwidth and unnecessary processing in certain situations.

The present invention is directed to overcoming the foregoing and other disadvantages. More specifically, the present invention is directed to more efficient data transmission by selectively performing FEC on the data in the data link layer that requires FEC protection.

SUMMARY OF THE INVENTION

In accordance with this invention, a method and system for performing optional or selective forward error correction (FEC) on data within the data link layer before the data is transmitted is provided. First, a determination is made as to what data in the data link layer is required to be FEC encoded and what data is not required to be FEC encoded. Next, the data link layer data determined to require FEC encoding is protected by FEC and the remaining data link layer data is not FEC protected.

In accordance with other aspects of the invention, a network application or network layer directly above the data link layer determines the portions required to be FEC encoded.

In accordance with still other aspects of the invention, the data link layer segments with the protected and unprotected portions are transmitted to a network layer.

As will be readily appreciated from the foregoing summary, the invention provides a method and system for providing more efficient data link layer data transmission. The result of the present invention is that unnecessary FEC is not performed. The result of performing FEC on only the data requiring FEC is a data rate increase of approximately one-third over existing systems that perform FEC on the entire data link layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is a block diagram of a paging/communication system for implementing the present invention;

FIG. 2 is a flow diagram illustrating the process of the invention for providing optional forward error correction transmission at the data link layer; and FIG. 3 is a structural diagram of a data link layer segment that has been optionally forward error correction coded in accordance with the present invention.

DETAILED DESCRIPTION OF THE PREFERRED EMBODIMENT

FIG. 1 illustrates a paging/communication system 10 that allows for optionally assigning forward error correction (FEC) to data link (medium access) layer transmission data. In the preferred embodiment, the paging/communication system 10 may be a paging terminal or other device that formulates pages for transmission to mobile paging units. An example of such a paging terminal that may be adapted to practice the present invention is the Model No. GL3000 paging terminal manufactured by Glenayre Electronics, Inc.

The paging/communication system 10 includes (in addition to other prior art devices) a binary data application 14, a voice data application 15, a processing unit 12, a transmission unit 18 and a receiving unit 16. The transmission and receiving units 18 and 16 provide communication from the paging/communication system 10 to a network 20. The network 20 may be a network of other paging/communication systems and paging transmitters. An example of such a network is described in co-pending, co-assigned, U.S. patent application Ser. No. 08/795,063 entitled "COMPUTER NETWORK USING ASSOCIATION AND ERA DATA", incorporated by reference herein. The communication method between the system 10 to the network 20 may be landline, satellite link, microwave link, or any other conventional method.

The data applications 14 and 15, coupled to the processing unit 12, can select the data in the data link layer to be FEC encoded. The processing unit 12 prepares the data link layer data for transmission based on what the application has designated. The transmission unit 18, coupled to the processing unit 12, transmits the prepared data link layer.

FIG. 2 illustrates a process performed by the components illustrated in FIG. 1. First, at block 40, the application determines the portions of the data to be transmitted that do not require FEC. Next, at block 44, the application 14 or 15 indicates the portions of the data link layer that do not require FEC as determined by the analysis in block 40. Typically, a binary data application would determine that all of the data would require FEC, while a voice data application may determine that voice data did not require FEC. Next, at block 48, the processing unit 12 partitions the data link layer segments into FEC and non-FEC sections according to the application-indicated portions that do not require FEC. Finally, at block 52, the partition data link layer segments are transmitted to the network.

FIG. 3 illustrates an example data link layer segment 60 with a first portion 62 protected by FEC and a second portion 63 not protected by FEC. The segment 60 includes a header block 64, an address block 66 and a data block 68. The header block 64 includes bits that identify the protected data length and the unprotected data length, as well as other header information. The values for the protected and unprotected length are entered by the processing unit 12 based on application input. The address block 66 includes conventional address information. The data block 68 includes a protected and unprotected data component. Most often the FEC-protected portion 62 would include at least the header block 64 and the address block 66, because these items almost always require protection.

An FEC algorithm used by the processing unit 12 provides the FEC protected and unprotected portions 62 and 63 for the segment 60 based on the application-identified protected and unprotected data components. The FEC protected portion 62 overlaps into the user identified unprotected data components because the FEC algorithm generally chunks the data into code words of a fixed size. Therefore, there will almost always be some data that was identified as not requiring FEC that will be included in the FEC protected portion 62.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of formulating paging messages for transmission to a mobile paging unit, the paging messages being formulated in accordance with a paging protocol having a data link layer, the method comprising the steps of:

determining the portions of said data link layer that require forward error correction coding as a first portion;

determining the portions of said data link layer that do not require forward error correciton coding as a second portion; and assigning said first portion of the data link layer segments to be forward error correction coded and said second portion to be unprotected by forward error correction.

2. The method of claim 1, wherein the step of determining the portions required to be forward error correction coded is performed by a network protocol layer above the data link layer.

3. The method of claim 1, further comprising:

supplying the assigned data link layer segments to a network layer.

4. A paging system for communicating a paging message in accordance with a paging protocol, said paging protocol including a data link layer, the paging system comprising:

at least one application for determining the portions of said data link layer that require forward error correction coding; and a processor for assigning a first portion of the data link layer segment to be forward error correction coded and a second portion to be unprotected by FEC according to said at least one application determination.

5. A method for performing data communication comprising:

determining the portions of a data link layer that do not require forward error correction coding; and assigning a portion of the data link layer segments to be forward error correction coded and a second portion to be unprotected by FEC according to the data link layer determination.

6. The method of claim 5, wherein determining the portions not required to be forward error correction coded is performed by a user.

7. The method of claim 5, further comprising:

supplying the assigned data link layer segments to a network layer.

8. A system for performing data communication comprising:

a first component for determining the portions of a data link layer that do not require forward error correction coding; and a second component for assigning a first portion of the data link layer segment to be forward error correction coded and a second portion to be unprotected by FEC according to the first component determination.

* * * * *